US012590819B2

(12) United States Patent
    Kubota

(10) Patent No.: US 12,590,819 B2
(45) Date of Patent: Mar. 31, 2026

(54) POSITION DETECTION DEVICE AND BRAKE PEDAL DEVICE

(71) Applicant: DENSO CORPORATION, Kariya-city (JP)

(72) Inventor: Takamitsu Kubota, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 216 days.

(21) Appl. No.: 18/538,621

(22) Filed: Dec. 13, 2023

(65) Prior Publication Data

US 2024/0110813 A1 Apr. 4, 2024

Related U.S. Application Data

(63) Continuation of application No. PCT/JP2022/021971, filed on May 30, 2022.

(30) Foreign Application Priority Data

Jul. 16, 2021 (JP) ................................. 2021-118217

(51) Int. Cl.
    *G01D 5/14* (2006.01)
    *B60T 7/04* (2006.01)
    (Continued)

(52) U.S. Cl.
    CPC ................ *G01D 5/14* (2013.01); *B60T 7/042* (2013.01); *B60T 7/06* (2013.01); *G01D 5/202* (2013.01); *B60T 2270/82* (2013.01); *G01D 5/145* (2013.01)

(58) Field of Classification Search
    CPC ........... G01D 5/14; G01D 5/202; G01D 5/145
    See application file for complete search history.

(56) References Cited

U.S. PATENT DOCUMENTS 7,439,734 B2 * 10/2008 Fischer ................ G01D 5/2451
                                                    324/252
10,252,747 B2 * 4/2019 Shiino .................. B62D 5/0421
                        (Continued)

FOREIGN PATENT DOCUMENTS

DE       102019124972 A1 * 1/2021 ........... G01D 5/2053
JP           2007102393 A   4/2007
                        (Continued)

*Primary Examiner* — Walter L Lindsay, Jr.
*Assistant Examiner* — Milton Gonzalez
(74) *Attorney, Agent, or Firm* — Nixon & Vanderhye P.C.

(57) ABSTRACT

A position detection device detects a position of a rotating body that is provided around a predetermined axis center with respect to a fixed body. A target is fixed to the rotating body. An inductive coil is fixed to the fixed body at a position facing the target in an axial center direction. The transmitting and receiving circuit applies an alternating current to the inductive coil and detects a position of the target. A magnetic circuit section is formed around the axis center and is fixed to the rotating body. A magnetic detection section is fixed to the fixed body and provided in region on a radially inner side than an inner circumferential surface of the magnetic circuit section. The target, the inductive coil, and the receiving and transmitting circuit constitute an inductive sensor, and the magnetic circuit section and the magnetic detection section constitute a magnet-type rotation angle sensor.

10 Claims, 11 Drawing Sheets

(51) Int. Cl.
　　B60T 7/06　　　　(2006.01)
　　G01D 5/20　　　　(2006.01)

(56)　　　　　　　References Cited

U.S. PATENT DOCUMENTS

| | | |
|---|---|---|
| 2004/0187625 A1 | 9/2004 | Schiel et al. |
| 2012/0056617 A1 | 3/2012 | Hirose et al. |
| 2019/0264764 A1 | 8/2019 | Lin |
| 2020/0307677 A1 | 10/2020 | Uematsu |
| 2020/0340834 A1 | 10/2020 | Inuzuka et al. |

FOREIGN PATENT DOCUMENTS

| | | | | |
|---|---|---|---|---|
| JP | 2008224574 A | 9/2008 | | |
| JP | 2012251809 A | 12/2012 | | |
| JP | 2016011833 A | 1/2016 | | |
| JP | 6747282 B2 | 8/2020 | | |
| JP | 2021025851 A | 2/2021 | | |
| WO | WO-2020229377 A1 * | 11/2020 | ............... | G01D 3/08 |
| WO | WO-2022058239 A1 * | 3/2022 | ............... | B62D 6/10 |

* cited by examiner

POSITION DETECTION DEVICE AND BRAKE PEDAL DEVICE

CROSS REFERENCE TO RELATED APPLICATIONS

This application is a continuation application of International Patent Application No. PCT/JP2022/021971 filed on May 30, 2022, which designated the U.S. and based on and claims the benefits of priority of Japanese Patent Application No. 2021-118217 filed on Jul. 16, 2021. The entire disclosure of all of the above applications is incorporated herein by reference.

TECHNICAL FIELD

The present disclosure relates to a position detection device and a brake pedal device equipped with the same.

BACKGROUND

A position detection device is known that detects a position of a rotating body that is rotatably or oscillatably provided around a predetermined axis with respect to a fixed body.

SUMMARY

An object of the present disclosure is to provide a position detection device and a brake pedal device that have redundancy with respect to a position detection of the rotating body and that improve a reliability of output signal.

According to one aspect of the present disclosure, in a position detection device that detects a position of a rotating body that is rotatably or oscillatably provided around a predetermined axis with respect to a fixed body, the position detection device includes a target, an inductive coil, a receiving and transmitting circuit, a magnetic circuit section, and a magnetic detection section.

The target is made of a conductive material and fixed to the rotating body. The inductive coil is fixed to the fixed body at a position facing the target in an axial center direction. The receiving and transmitting circuit detects a position of the target based on a change in an inductance of the inductive coil, which changes due to an eddy current flowing through the target when an alternating current is applied to the inductive coil.

The magnetic circuit section is cylindrically formed around an axis center and fixed to the rotating body to form a magnetic field in which magnetic flux flies in a direction intersecting the axis center. The magnetic detection section is fixed to the fixed body and provided in a region radially inward from an inner peripheral surface of the magnetic circuit section, and outputs a signal corresponding to the magnetic field formed by the magnetic circuit section.

The target, the inductive coil, and the receiving and transmitting circuit constitute an inductive sensor, and the magnetic circuit section and the magnetic detection section constitute a magnet-type rotation angle sensor.

DETAILED DESCRIPTION

Figure 1:
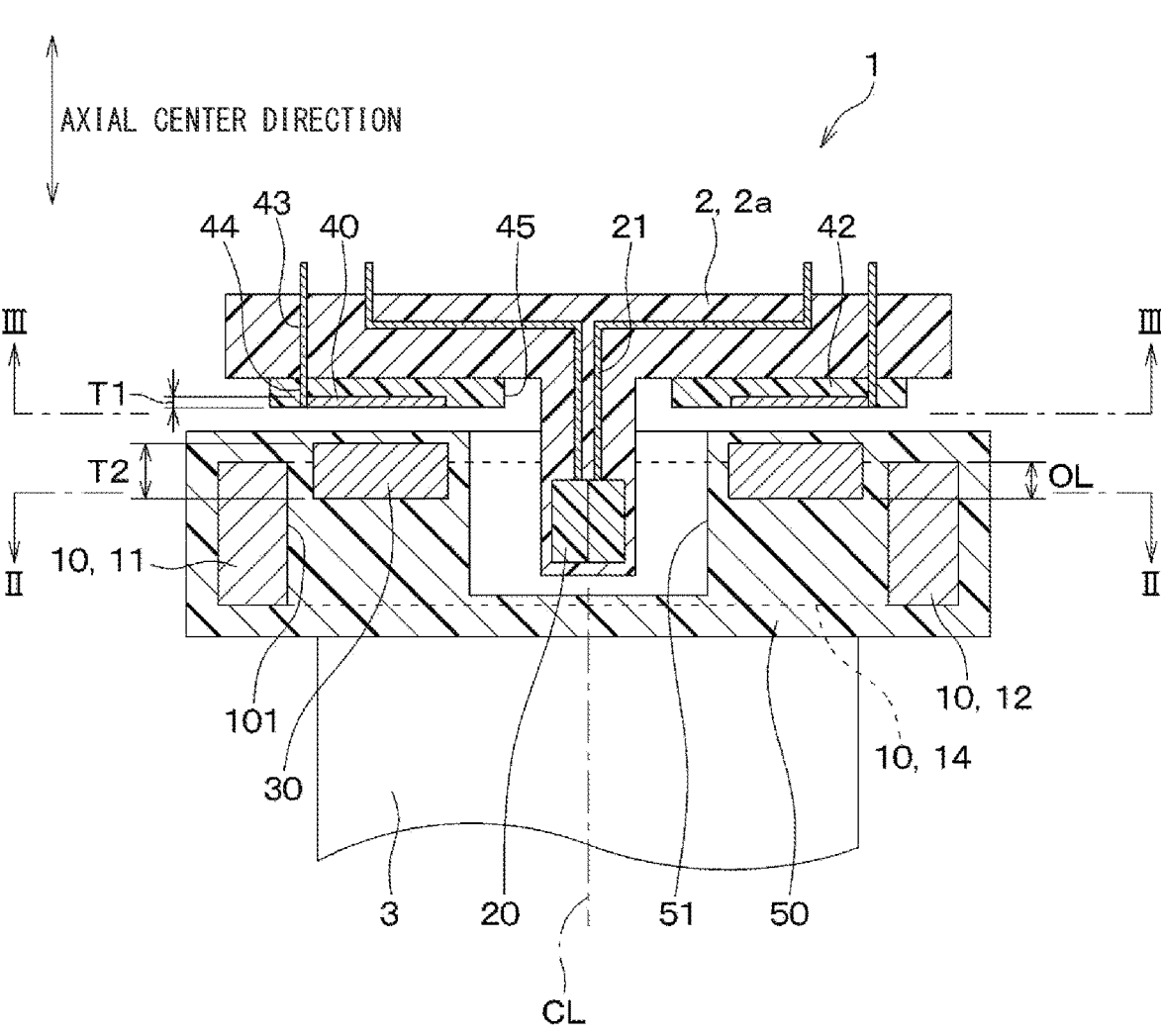
FIG. 1 is a cross-sectional view parallel to an axis center of a rotating body in a position detection device according to a first embodiment.

In an assumable example, a position detection device detects a position of a rotating body that is rotatably or oscillatably provided around a predetermined axis with respect to a fixed body. The term "oscillate" refers to rotation in forward and reverse directions within a predetermined angular range around the predetermined axis.

The position detection device has redundancy in detecting the position of the rotating body by using two position detection means such as an inductive sensor and a magnet-type rotation angle sensor. Specifically, a target of the inductive sensor and a magnet of the magnet-type rotation angle sensor are fixed to the rotating body and rotate together with the rotating body. On the other hand, the coil included in the inductive sensor and the magnetoresistive element included in the magnet-type rotation angle sensor are mounted on a substrate placed radially outside the magnet. The substrate is fixed to the fixed body that does not rotate.

However, in the position detection device described above, the magnetoresistive element is mounted on the substrate provided radially outside the cylindrical magnet included in the magnet-type rotation angle sensor, and a space radially outward from the magnetoresistive element is open. Therefore, in this position detection device, when a disturbance magnetic field enters from the space radially outward from the magnetoresistive element in a radial direction, the magnetoresistive element is affected by the disturbance magnetic field. Therefore, there is a concern that a reliability of an output signal of the magnetoresistive element will deteriorate.

An object of the present disclosure is to provide a position detection device and a brake pedal device that have redundancy with respect to a position detection of the rotating body and that improve a reliability of output signals.

According to one aspect of the present disclosure, in a position detection device that detects a position of a rotating body that is rotatably or oscillatably provided around a predetermined axis with respect to a fixed body, the position detection device includes a target, an inductive coil, a receiving and transmitting circuit, a magnetic circuit section, and a magnetic detection section.

The target is made of a conductive material and fixed to the rotating body. The inductive coil is fixed to the fixed body at a position facing the target in an axial center direction. The receiving and transmitting circuit detects a position of the target based on a change in an inductance of the inductive coil, which changes due to an eddy current flowing through the target when an alternating current is applied to the inductive coil.

The magnetic circuit section is cylindrically formed around an axis center and fixed to the rotating body to form a magnetic field in which magnetic flux flies in a direction intersecting the axis center. The magnetic detection section is fixed to the fixed body and provided in a region radially inward from an inner peripheral surface of the magnetic circuit section, and outputs a signal corresponding to the magnetic field formed by the magnetic circuit section.

The target, the inductive coil, and the receiving and transmitting circuit constitute an inductive sensor, and the magnetic circuit section and the magnetic detection section constitute a magnet-type rotation angle sensor.

According to this configuration, the cylindrical magnetic circuit section functions as a magnetic shield, and prevents a disturbance magnetic field from penetrating from a region on a radially outer side of the magnetic circuit section to a region on a radially inner side of the magnetic circuit section. Therefore, the magnetic detection section provided in the radially inner region of the magnetic circuit section is not affected by the disturbance magnetic field, so that the reliability of the output signal of the magnetic detection section can be improved.

Furthermore, the position detection device includes position detection means of different types, such as the inductive sensor having the target, the inductive coil, and the receiving and transmitting circuit, and the magnet-type rotation angle sensor having the magnetic circuit section and the magnetic detection section. As a result, this position detection device has redundancy in detecting the position of the rotating body, so that reliability can be further improved.

Another aspect of the present disclosure relates to a brake-by-wire type brake pedal device mounted on a vehicle. A brake pedal device includes the position detection device according to one aspect of the present disclosure, a fixed body directly or indirectly fixed to a vehicle, a shaft as a rotating body, and a brake pedal fixed to the shaft and oscillating around an axis center of the shaft.

According to this configuration, the brake pedal device according to another aspect is equipped with the position detection device according to the one aspect of the present disclosure. Therefore, the brake pedal device prevents a disturbance magnetic field from entering the magnetism detecting portion, and has redundancy in detecting an oscillating angle of the shaft by the inductive sensor and the magnet-type rotation angle sensor.

Hereinafter, embodiments of the present disclosure will be described with reference to the drawings. In the following embodiments, the same or equivalent parts are denoted by the same reference numerals as each other, and explanations will be provided to the same reference numerals.

First Embodiment

Figure 2:
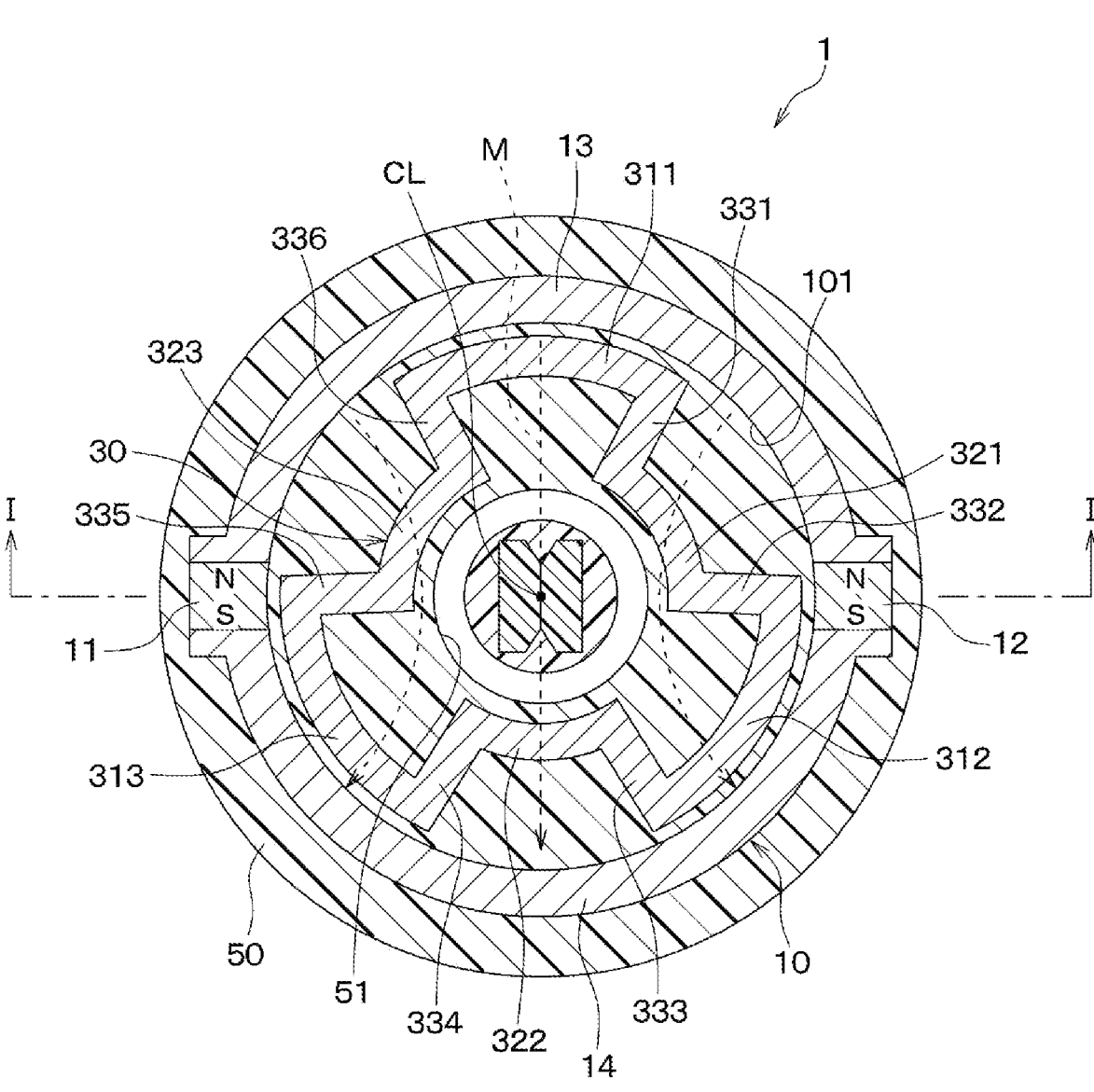
FIG. 2 is a cross-sectional view taken along a line II-II of FIG. 1.
Figure 3:
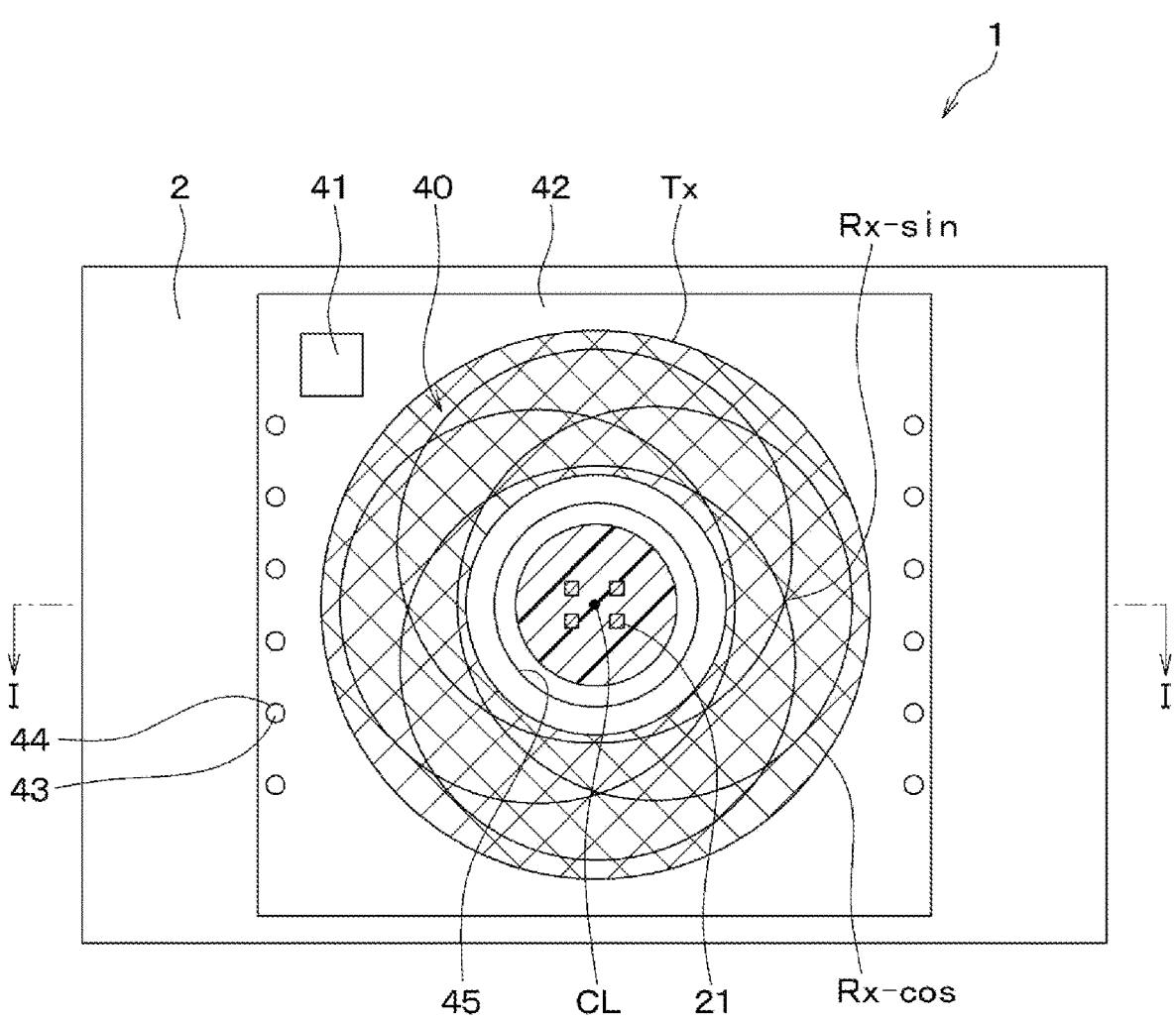
FIG. 3 is a cross-sectional view taken along a line III-III of FIG. 1.

A first embodiment will be described with reference to the drawings. As shown in FIGS. 1 to 3, a position detection device 1 of the present embodiment detects a position of a rotating body 3 that is rotatably or oscillatably provided around a predetermined axis center CL with respect to a fixed body 2. The position detection device 1 can be used, for example, to detect the position of various rotating bodies 3 included in a brake pedal device, an accelerator pedal device, an electric motor, a gear mechanism, etc. mounted on a vehicle.

In the following explanation, a radial direction in a virtual circle drawn on a virtual plane perpendicular to the axis center CL of the rotating body 3 is simply referred to as a "radial direction", and a side closer to the axis center CL in the radial direction is referred to as a "radially inner side," and a side farther from the axis center CL is referred to as a "radially outer side." Further, a direction in which the axis center CL extends is referred to as a "axial center direction."

The position detection device 1 includes a magnetic circuit section 10, a magnetic detection section 20, a target 30, an inductive coil 40, a transmitting and receiving circuit 41, and the like. The magnetic circuit section 10 and the magnetic detection section 20 constitute a magnet-type rotation angle sensor. On the other hand, the target 30, the inductive coil 40, and the transmitting and receiving circuit 41 constitute an inductive sensor. The position detection device 1 has redundancy in detecting the position of the rotating body 3 by including different types of position detection means such as the magnet-type rotation angle sensor and the inductive sensor.

As shown in FIGS. 1 and 2, the cylindrical magnetic circuit section 10 forming part of the magnet-type rotation angle sensor and the target 30 forming part of the inductive sensor are fixed to the rotating body 3.

The magnetic circuit section 10 is formed into a cylindrical shape by two permanent magnets 11 and 12 and two arc-shaped yokes 13 and 14, and is provided around the axis center CL of the rotating body 3. The two permanent magnets 11 and 12 and the two arc-shaped yokes 13 and 14 constitute a closed magnetic circuit. The closed magnetic circuit is a circuit in which the permanent magnets 11 and 12 and the yokes 13 and 14 are in contact with each other and a loop through which the magnetic flux flows is closed.

The two permanent magnets 11 and 12 are arranged on one side and the other side in the radial direction with respect to the axis center CL. In the following description, of the two permanent magnets 11 and 12, a magnet arranged on one side in the radial direction with respect to the axis center CL is called the first magnet 11, and a magnet arranged on the other side in the radial direction with respect to the axis center CL is called the second magnet 12. Further, one of the two yokes 13 and 14 is called the first yoke 13, and the other yoke is called the second yoke 14.

The first yoke 13 has one end in the circumferential direction connected to the N pole of the first magnet 11 and the other end in the circumferential direction connected to the N pole of the second magnet 12. The second yoke 14 has one end in the circumferential direction connected to the S pole of the first magnet 11 and the other end in the circumferential direction connected to the S pole of the second magnet 12. Therefore, as indicated by the dashed arrow M in FIG. 2, in a region on the radially inner side of the magnetic circuit section 10, a magnetic field is formed by magnetic flux in a direction crossing the axis center CL from the first yoke 13 toward the second yoke 14. As shown in FIG. 1, the magnetic field is formed in a range where the target 30 and the magnetic circuit section 10 do not overlap in the radial direction when viewed from the radial direction of the magnetic circuit section 10.

When the magnetic circuit section 10 rotates or oscillates around the axis center CL together with the rotating body 3, a direction of the magnetic field formed in the region on the radially inner side of the magnetic circuit section 10 changes. The magnetic detection section 20 that constitutes a part of the magnet-type rotation angle sensor is provided in the region on the radially inner side of the magnetic circuit section 10 (specifically, the region inside the recess 51 of the resin section 50, which will be described later). The magnetic circuit section 10 is formed into a cylindrical shape and surrounds the magnetic detection section 20. Therefore, the magnetic circuit section 10 functions as a magnetic shield that prevents a disturbance magnetic field from entering a region on the radially inner side of the magnetic circuit section 10 (in other words, the area where the magnetic detection section 20 is provided) from a region on the radially outer side of the magnetic circuit section 10. Details of the magnetic detection section 20 will be described later.

The target 30 is arranged in a region on the radially inner side than an inner circumferential surface 101 of the cylindrical magnetic circuit section 10. The region on the radially inner side from the inner circumferential surface 101 of the magnetic circuit section 10 is a range that also includes a position shifted in an axial center direction with respect to the magnetic circuit section 10. As shown in FIG. 1, in the first embodiment, the target 30 and the magnetic circuit section 10 are provided so that at least a part of the target 30 and a part of the magnetic circuit section 10 overlap in the radial direction when viewed from the radial direction of the magnetic circuit section 10. In FIG. 1, when viewed from the radial direction of the magnetic circuit section 10, the range where the target 30 and the magnetic circuit section 10 overlap in the radial direction is indicated by a double arrow OL.

The target 30 is made of a conductor such as metal, and is provided around the axis center CL. The target 30 includes, for example, three outer arc parts 311 to 313, three inner arc parts 321 to 323, and six connections 331 to 336 connecting the outer arc parts 311 to 313 and inner arc parts 321 to 323. The three outer arc parts 311 to 313 are arranged at approximately equal intervals in the circumferential direction. The three inner arc parts 321 to 323 are arranged radially inner than the outer arc parts 311 to 313 and at approximately equal intervals in the circumferential direction. The outer arc parts 311 to 313 and the inner arc parts 321 to 323 that are adjacent to each other in the circumferential direction are located at positions that are shifted in the circumferential direction (that is, positions where the outer arc parts 311 to 313 and the inner arc parts 321 to 323 do not overlap in the radial direction except for the circumferential ends) The six connections 331 to 336 extend in the radial direction and connect the circumferential ends of the outer arc parts 311 to 313 and the circumferential ends of the inner arc parts 321 to 323.

The number and shape of the outer arc parts 311 to 313, the inner arc parts 321 to 323, and connections 331 to 336 included in the target 30 can be set arbitrarily.

The magnetic circuit section 10 and the target 30 are integrally formed by a resin section 50. Specifically, the resin section 50 integrally constitutes the magnetic circuit section 10 and the target 30 by resin insert molding. As a result, the magnetic circuit section 10 and the target 30 are formed into a sub-assembly, and misalignment between the magnetic circuit section 10 and the target 30 is prevented. A recess 51 is provided in the center of the resin section 50 and is recessed from the fixed body 2 side toward the rotating body 3 side. The magnetic detection section 20 that constitutes a part of a magnet-type rotation angle sensor is provided inside the recess 51.

The resin section 50 is fixed to the rotating body 3. That is, the magnetic circuit section 10 and the target 30 formed into a sub-assembly are fixed to the rotating body 3 via the resin section 50. In this state, the center of the magnetic circuit section 10, the center of the target 30, and the axis center CL of the rotating body 3 are aligned. The magnetic circuit section 10 and the target 30 rotate or oscillate together with the rotating body 3 around the axis center CL of the rotating body 3.

On the other hand, the magnetic detection section 20 that forms part of a magnet-type rotation angle sensor and a circuit board 42 on which an inductive coil 40 and a transmitting and receiving circuit 41 that form part of the inductive sensor are mounted are fixed to the fixed body 2. That is, the inductive coil 40 and the transmitting and receiving circuit 41 are fixed to the fixed body 2 while being mounted on the circuit board 42. In the following description, the inductive coil 40 will be simply referred to as "coil 40."

The magnetic detection section 20 includes, for example, two magnetoresistive elements (hereinafter referred to as "MR elements") or two Hall elements. The MR element is an element whose electrical resistance value changes depending on the angle of the magnetic field in the horizontal direction with respect to the magnetically sensitive surface. The Hall element is an element that outputs a Hall voltage depending on a strength of a magnetic field perpendicular to a magnetically sensitive surface. When the magnetic detection section 20 is composed of two MR elements, the two MR elements are arranged so that their respective resistance values differ depending on the angle of the rotating section. Thereby, by calculating the difference between the resistance values of the two MR elements, it is possible to perform accurate angle detection with respect to temperature changes. Even when the magnetic detection section 20 is composed of two Hall elements, the two Hall elements are arranged so that their respective output voltages differ depending on the angle of the rotating section.

In the first embodiment, the magnetic detection section 20 and the terminal 21 extending from the magnetic detection section 20 (hereinafter referred to as "magnetic detection section terminal 21") are constructed integrally with the resin constituting the fixed body 2 by resin insert molding. The magnetic detection section 20 is provided so as to extend into the region on the radially inner side of the magnetic circuit section 10 (specifically, an inner region of the recess 51 of the resin section 50) together with resin forming the fixed body 2 from the base 2*a* of the fixed body 2.

Further, a terminal 43 (hereinafter referred to as "inductive sensor terminal 43") connected to the circuit board 42 is also constructed integrally with the resin constituting the fixed body 2 by resin insert molding. That is, the resin constituting the fixed body 2, the magnetic detection section 20, the terminal 21 for the magnetic detection section, and the inductive sensor terminal 43 are constructed integrally by resin insert molding.

The circuit board 42 is fixed to the surface of the fixed body 2 facing the magnetic circuit section 10 side. The circuit board 42 and the fixed body 2 are connected by, for example, inserting a tip of the inductive sensor terminal 43 protruding from the fixed body 2 into a through hole 44 provided in the circuit board 42. Then, the circuit board 42 and the fixed body 2 are connected by electrically joining the through hole 44 and the tip of the inductive sensor terminal 43 with solder. A hole 45 through which the magnetic detection section 20 is inserted is provided in the center of the circuit board 42. The magnetic detection section 20 passes through the hole 45 of the circuit board 42 and is provided in a region on the radially inner side of the magnetic circuit section 10 (specifically, an inner region of the recess 51 of the resin section 50).

The coil 40 and the transmitting and receiving circuit 41 are mounted on the circuit board 42. The coil 40 is provided at a position facing the target 30 in the axial direction. A thickness T1 in the axial center direction of the coil 40 of the circuit board 42 is smaller than a thickness T2 of the target 30 in the axial center direction.

In FIG. 3, the area where the coil 40 is mounted on the circuit board 42 is shown by a cross hatching. Moreover, although FIG. 3 shows an example of the shape of the coil 40 mounted on the circuit board 42, the shape of the coil 40 is not limited to this, and various shapes can be adopted. The shape of the coil 40 is, for example, a sine curve with the circumferential direction as the horizontal axis. The coil 40 includes one pattern of transmitting coil Tx and two patterns of receiving coils Rx-sin and Rx-cos.

The transmitting and receiving circuit 41 is configured as an integrated circuit (i.e., IC) mounted on a substrate. The transmitting and receiving circuit 41 applies an alternating current to the coil 40 and detects the position of the target 30 based on the change of the inductance of the coil 40 using the physical principle of eddy currents generated in the target 30 moving on the coil pattern.

The first embodiment is the configuration in which two outputs can be obtained from the inductive sensor. Specifically, for example, it is possible to adopt a configuration in which two outputs are obtained by one pattern of the transmission coil Tx, two patterns of the receiving coil Rx-sin, Rx-cos (that is, one pattern for Rx-sin and another pattern for Rx-cos), and the two transmitting and receiving circuits 41. In this case, two signals Tx1 and Tx2 are applied to one pattern of transmitting coil Tx, and a single transmitter in the transmitting and receiving circuit 41 can make the transmission.

Alternatively, it is also possible to adopt a configuration in which two outputs are obtained by two patterns of the transmission coil Tx, two patterns of the receiving coil Rx-sin, Rx-cos (that is, one pattern for Rx-sin and another pattern for Rx-cos), and the two transmitting and receiving circuits 41. In this case, two signals Tx1 and Tx2 are applied to each of the two patterns of transmitting coils Tx, and the two transmitters in the transmitting and receiving circuit 41 can make the transmission.

The two transmitting and receiving circuits 41 (that is, the two IC chips) may be provided in one package or may be respectively provided in two packages.

With the configuration described above, when the rotating body 3 rotates or oscillates around the axis center CL with respect to the fixed body 2, the magnetic circuit section 10 and the target 30 fixed to the rotating body 3 also rotate or oscillate together with the rotating body 3. At this time, the magnetic detection section 20 fixed to the fixed body 2 side outputs a signal according to the direction of the magnetic field formed by the magnetic circuit section 10. Further, the transmitting and receiving circuit 41 mounted on the circuit board 42 fixed to the fixed body 2 side outputs a signal according to the position of the target 30.

The position detection device 1 of the first embodiment described above has the following effects.

(1) In the first embodiment, the cylindrical magnetic circuit section 10 functions as a magnetic shield, and prevents a disturbance magnetic field from penetrating from the region on the radially outer side of the magnetic circuit section 10 to the region on the radially inner side of the magnetic circuit section 10. Therefore, the magnetic detection section 20 provided in the region on the radially inner side of the magnetic circuit section 10 is not affected by the disturbance magnetic field, so the position detection device 1 improves the reliability of the output signal of the magnetic detection section 20.

Further, the position detection device 1 includes position detection means of different types, such as the inductive sensor having the target 30, the coil 40, and the transmitting and receiving circuit 41, and the magnet type rotation angle sensor having the magnetic circuit section 10 and the magnetic detection section 20. Thereby, this position detection device 1 can improve reliability by having redundancy in detecting the position of the rotating body 3.

(2) In the first embodiment, the magnetic detection section 20 is formed integrally with the fixed body 2 by resin insert molding, and extends from the base 2a of the fixed body 2 to the region on the radially inner side of the magnetic circuit section 10. The circuit board 42 has the hole 45 through which the magnetic detection section 20 is inserted. Thereby, the circuit board 42 can be provided so as to surround the magnetic detection section 20.

(3) In the first embodiment, the thickness T1 in the axial center direction of the coil 40 of the circuit board 42 is smaller than the thickness T2 of the target 30 in the axial center direction. Thereby, by fixing the coil 40, which is thinner than the target 30, to the surface of the fixed body 2 facing the magnetic circuit section 10 side, the size of the position detection device 1 in the axial direction can be reduced in size.

(4) In the first embodiment, the magnetic circuit section 10 and the target 30 are inserted into the resin section 50 and are integrally constructed. According to this configuration, by forming the magnetic circuit section 10 and the target 30 into a sub-assembly by the resin section 50, the number of parts can be reduced and the ease of assembly to the rotating body 3 can be improved. Furthermore, by forming it the sub-assembly, the center of the magnetic circuit section 10, the center of the target 30, and the axis center CL of the rotating body 3 can be easily provided coaxially. Therefore, the reliability of the output signals of the magnetic rotation angle sensor and the inductive sensor included in the position detection device 1 can be improved.

(5) In the first embodiment, the target 30 constituting a part of the inductive sensor is disposed in a region on the radially inner side with respect to the inner circumferential surface 101 of the magnetic circuit section 10.

According to this configuration, it is possible to arrange the target 30 by effectively utilizing the region between the magnetic circuit section 10 and the magnetic detection section 20. Therefore, the position detection device 1 can be reduced in size in the radial direction.

(6) In the first embodiment, when viewed from the radial direction of the magnetic circuit section 10, at least a part of the target 30 and a part of the magnetic circuit section 10 are provided at positions that overlap in the radial direction.

Unlike the configuration of the first embodiment, when the target 30 and the magnetic circuit section 10 are provided at positions shifted from each other in the axial direction, the thickness of the target 30 in the axial direction may increase the size of the position detection device 1 in the axial direction. On the other hand, in the position detection device 1 of the first embodiment, by arranging the target 30 and the magnetic circuit section 10 as described above, it is possible to reduce the size of the position detection device 1 in the axial direction.

First Modification of First Embodiment

Figure 4:
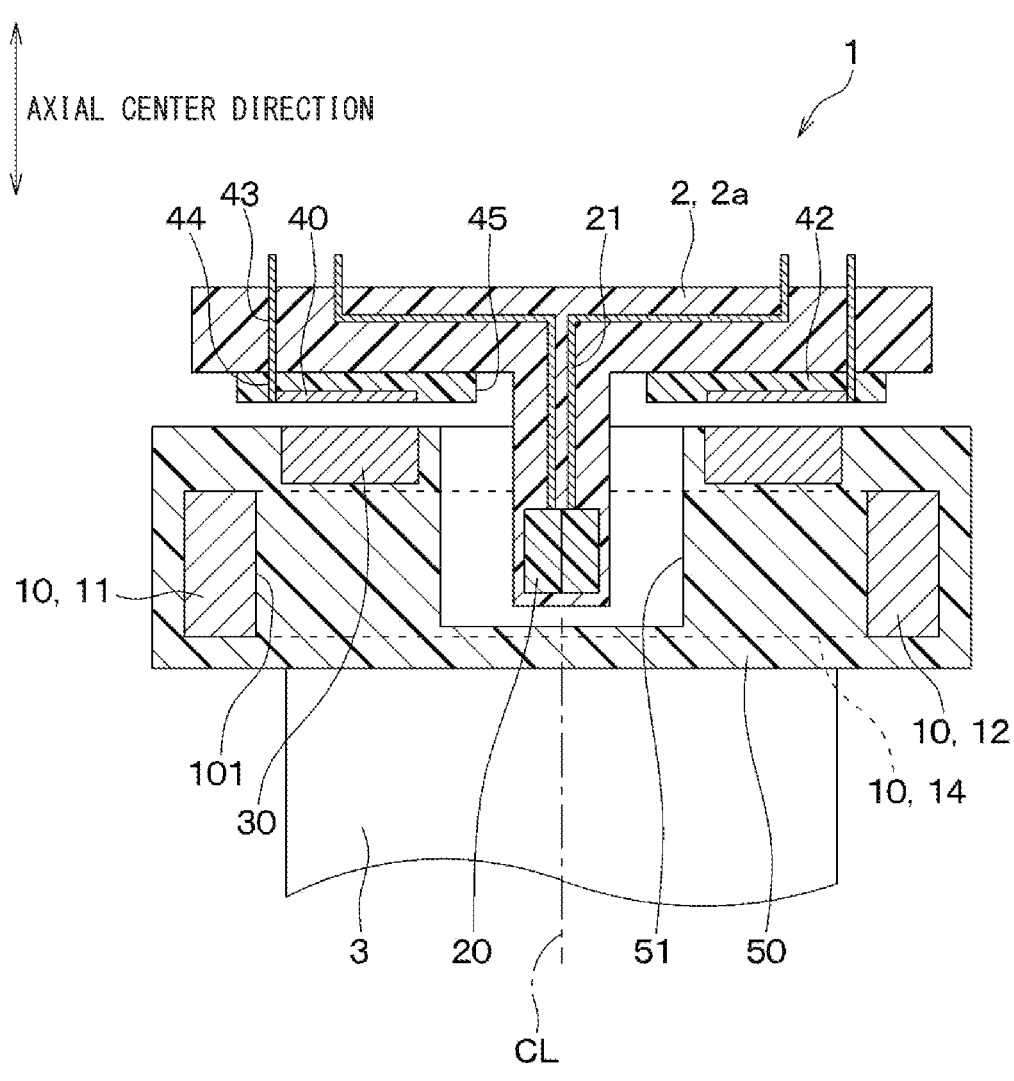
FIG. 4 is a cross-sectional view parallel to the axis center of a rotating body in a first modified example of the first embodiment.

A first modification of the first embodiment will be described. As shown in FIG. 4, in the first modification, the target 30 and the magnetic circuit section 10 are provided at positions shifted in the axial direction. That is, when viewed from the radial direction of the magnetic circuit section 10, the target 30 and the magnetic circuit section 10 are provided so as not to overlap in the radial direction. In this case, by reducing the thickness of the magnetic circuit section 10 in the axial direction, it is possible to reduce the size of the position detection device 1 in the axial direction. Therefore, the first modification also provides the same effects as the first embodiment.

Second Modification of First Embodiment

Figure 5:
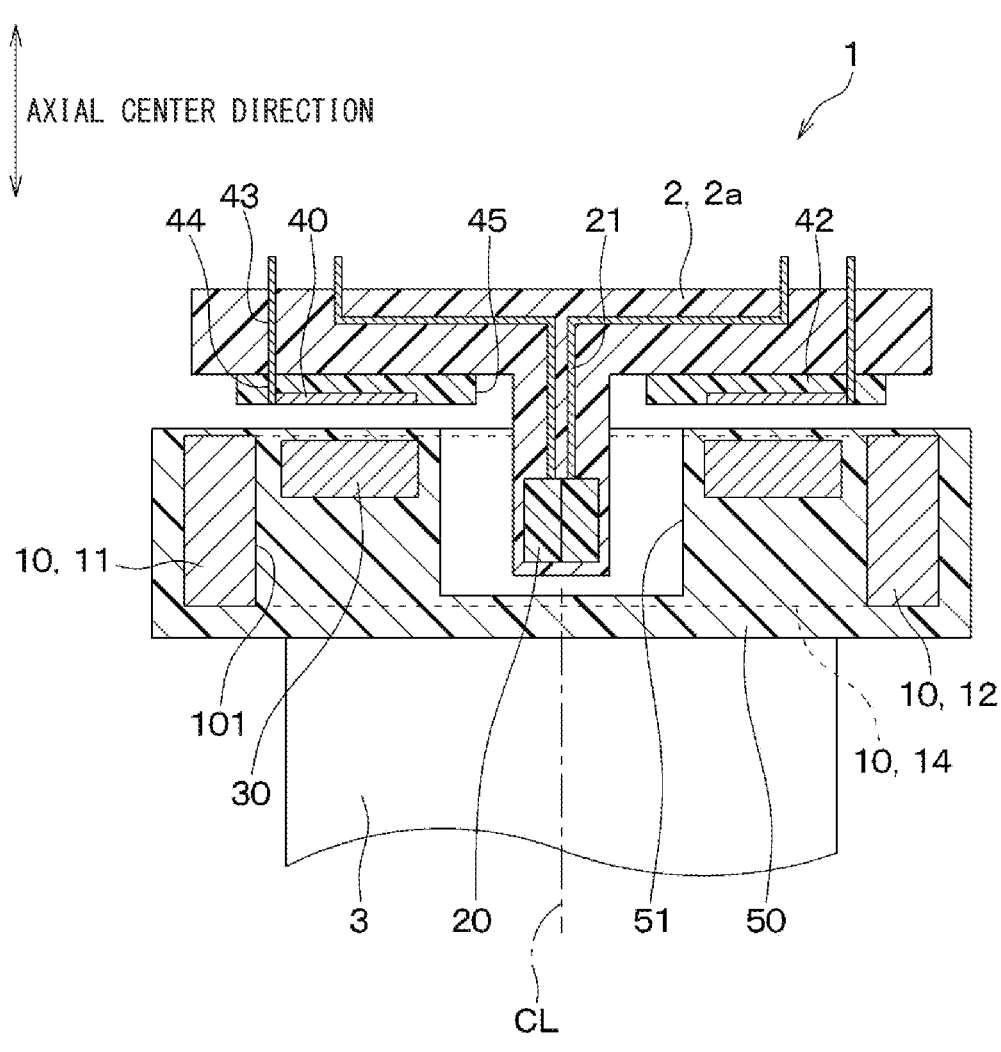
FIG. 5 is a cross-sectional view parallel to the axis center of a rotating body in a second modified example of the first embodiment.

A second modification of the first embodiment will be described. As shown in FIG. 5, in the second modification, when viewed from the radial direction of the magnetic circuit section 10, the entire target 30 and a part of the magnetic circuit section 10 are provided so as to overlap in the radial direction. In the second modification, the size of the position detection device 1 in the axial direction can be further reduced.

Second Embodiment

A second embodiment will be described. In the second embodiment, the configuration of members arranged on the fixed body 2 side is changed from that of the first embodiment, and the remaining configurations are the same as those of the first embodiment, and therefore, only portions different from the first embodiment will be described.

Figure 6:
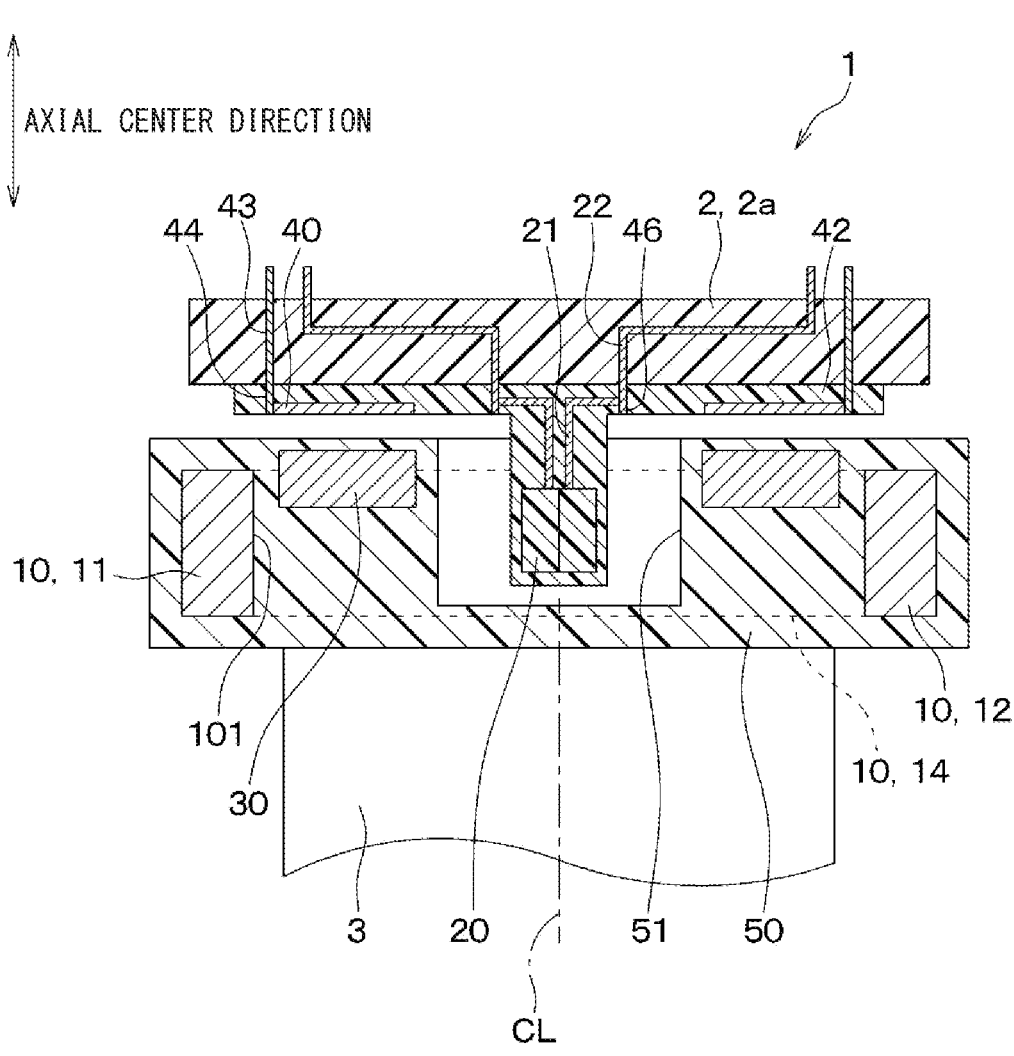
FIG. 6 is a cross-sectional view parallel to an axis center of a rotating body in a position detection device according to a second embodiment.

As shown in FIG. 6, in the second embodiment, the magnetic detection section 20, the terminal 21 for the magnetic detection section extending from the magnetic detection section 20, the coil 40, the transmitting and receiving circuit 41, etc. are mounted on the circuit board 42. The circuit board 42 is provided on the surface of the fixed body 2 facing the magnetic circuit section 10 side. That is, the magnetic detection section 20, the terminal 21 for the magnetic detection section 20, the coil 40, and the transmitting and receiving circuit 41 are fixed to the fixed body 2 while being mounted on the circuit board 42.

In the second embodiment, the magnetic detection section 20 is provided so as to extend from the circuit board 42 to the region on the radially inner side of the magnetic circuit section 10 (specifically, the inner region of the recess 51 of the resin section 50). The end of the magnetic detection section terminal 21 on the opposite side from the magnetic detection section 20 is electrically connected to a central through hole 46 provided in the circuit board 42.

On the other hand, the fixed body 2 is provided with a fixed body side terminal 22. The fixed body side terminal 22 is constructed integrally with the resin constituting the fixed body 2 by resin insert molding. The tip of the fixed body side terminal 22 that protrudes from the fixed body 2 toward the rotating body 3 is inserted into the central through hole 46 provided in the circuit board 42 and electrically joined to the central through hole 46 by solder. As a result, the fixed body 2 and the circuit board 42 are fixed, and the magnetic detection section terminal 21, the central through hole 46, and the fixed body side terminal 22 are electrically connected.

The inductive sensor terminal 43 is also constructed integrally with the resin constituting the fixed body 2 by resin insert molding. The inductive sensor terminal 43 is also inserted into the through hole 44 provided in the circuit board 42 and electrically joined to the central through hole 46 by solder.

In the position detection device 1 of the second embodiment described above, the magnetic detection section 20, the coil 40, and the transmitting and receiving circuit 41 are mounted on the circuit board 42. The circuit board 42 is provided on the surface of the fixed body 2 facing the magnetic circuit section 10 side. Thereby, it is possible to prevent misalignment between the magnetic detection section 20 and the plurality of coil patterns. Therefore, the reliability of the output signals of the magnetic rotation angle sensor and the inductive sensor included in the position detection device 1 can be improved.

Third Embodiment

A third embodiment will be described. In the third embodiment, a processing circuit for self-diagnosis is changed with respect to the first embodiment, and the other parts are similar to that in the first embodiment, so only the difference from the first embodiment will be described.

Figure 7:
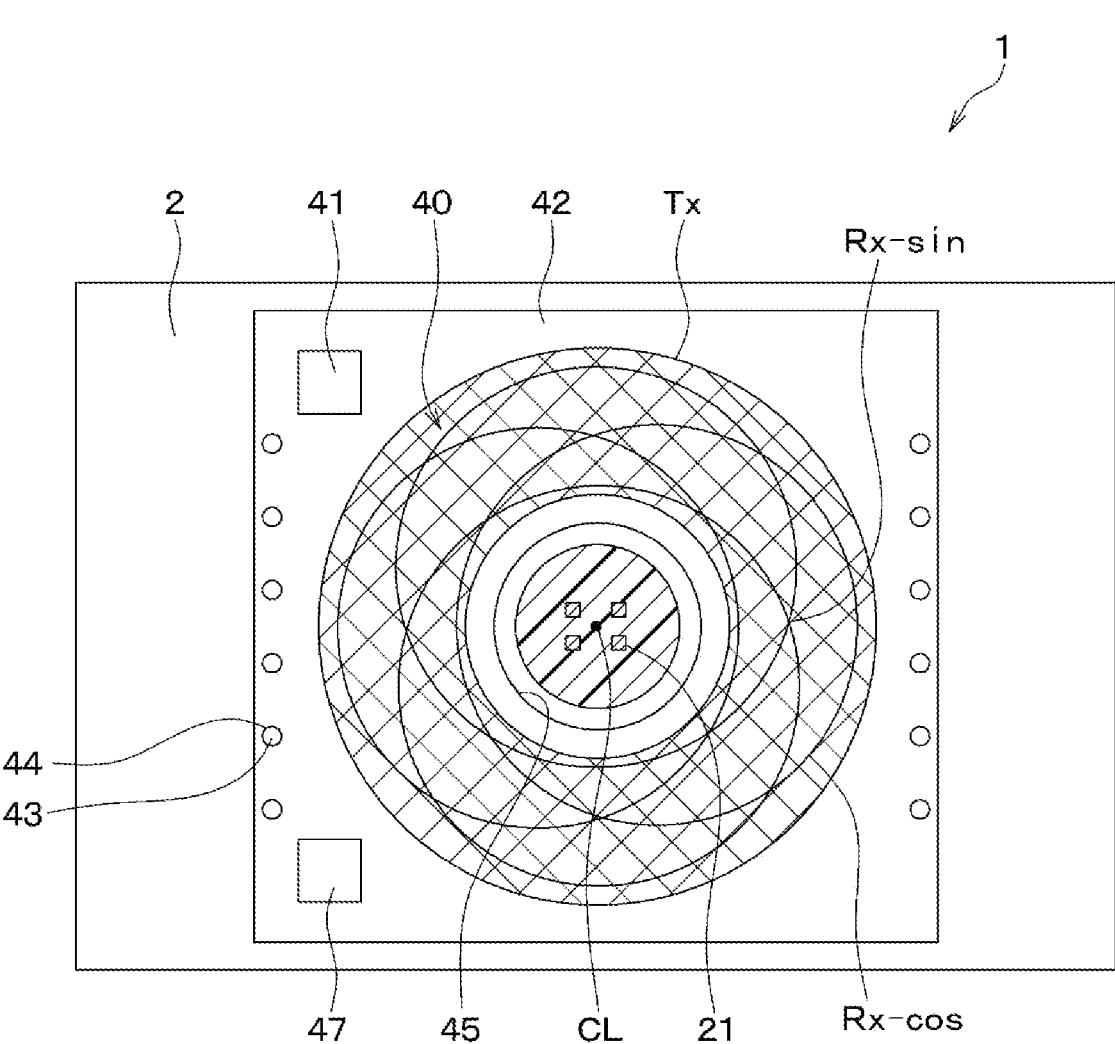
FIG. 7 is a cross-sectional view of a part corresponding to FIG. 3 in a position detection device according to a third embodiment.

As shown in FIG. 7, in the third embodiment, the circuit board 42 is provided with a processing circuit 47 that self-diagnoses whether the output signal of the inductive sensor and the output signal of the magnet-type rotation angle sensor are normal. This processing circuit 47 calculates the difference between the position of the rotating body 3 derived from the output signal of the transmitting and receiving circuit 41 and the position of the rotating body 3 derived from the output of the magnetic detection section 20. The processing circuit 47 compares the calculated value (hereinafter referred to as "output difference") with a predetermined threshold value stored in a storage area in advance. Then, when the output difference is smaller than a predetermined threshold, the processing circuit 47 determines that both the output signal of the transmitting and receiving circuit 41 and the output signal of the magnetic detection section 20 are correct. On the other hand, when the output difference is larger than the predetermined threshold, the processing circuit 47 determines that at least one of the output signal of the transmitting and receiving circuit 41 and the output signal of the magnetic detection section 20 is incorrect. Then, the processing circuit 47 transmits the determination result to the outside. The storage area is a non-transitional tangible storage medium.

The processing circuit 47 may be packaged separately from the transmitting and receiving circuit 41 as shown in FIG. 7, or may be packaged integrally with the transmitting and receiving circuit 41, although not shown.

In the third embodiment described above, the position detection device 1 includes the processing circuit 47 that self-diagnoses whether or not the output signal of the transmitting and receiving circuit 41 and the output signal of the magnetic detection section 20 are normal. The reliability of the output signal of the inductive sensor and the output signal of the magnetic rotation angle sensor can be improved.

Fourth Embodiment

A fourth embodiment will be described. In the fourth embodiment, a part of the configuration of the magnetic circuit section 10 is changed with respect to the first embodiment, and the other parts are similar to that in the first embodiment, so only the difference from the first embodiment will be described.

Figure 8:
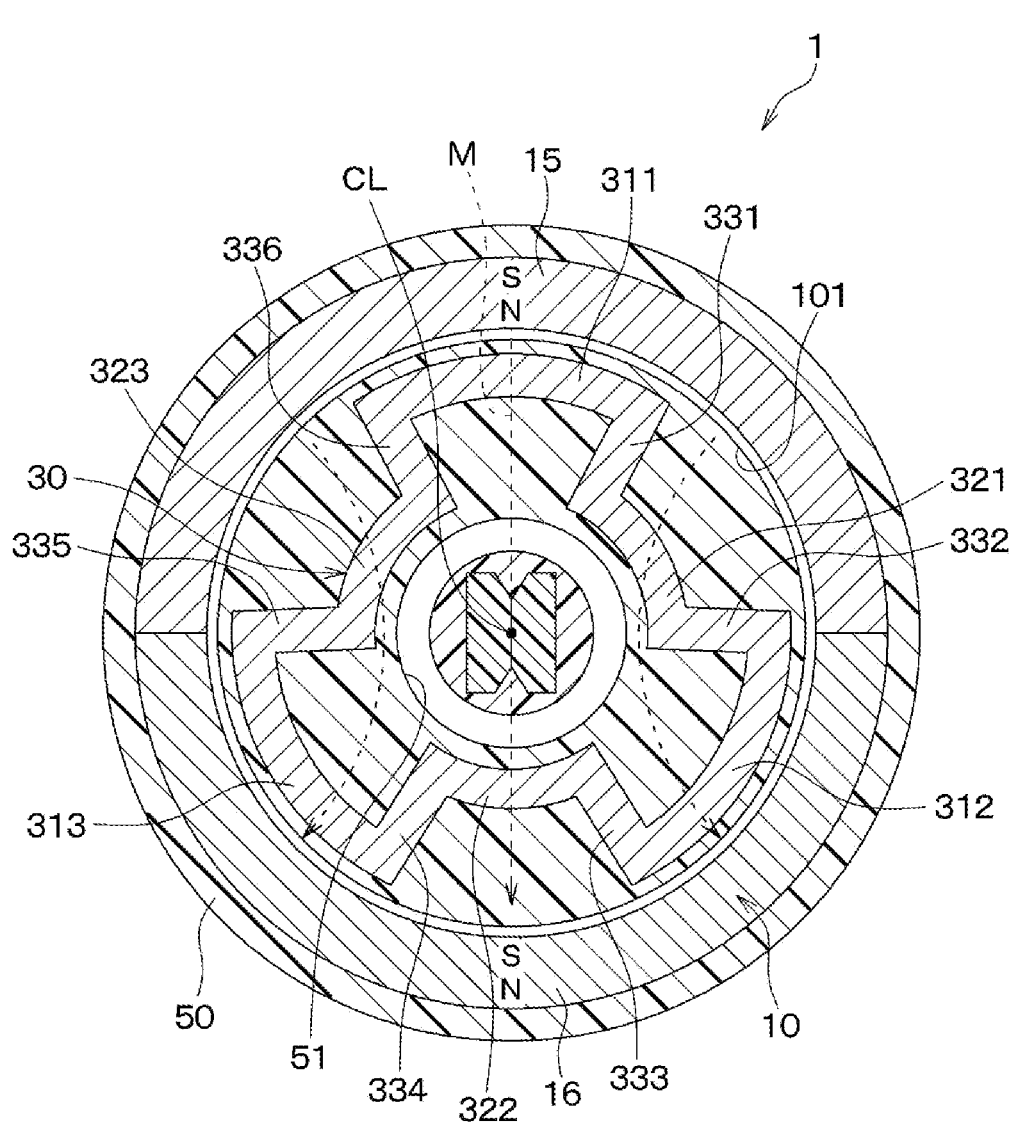
FIG. 8 is a sectional view of a part corresponding to FIG. 2 in a position detection device according to a fourth embodiment.

As shown in FIG. 8, in the fourth embodiment, the magnetic circuit section 10 is formed into a cylindrical shape by a first arc-shaped magnet 15 and a second arc-shaped magnet 16, each of which has an arc-shaped cross section perpendicular to the axis center CL and is provided around the axis center CL of the rotating body 3. The magnetic circuit section 10 of the fourth embodiment does not have the yokes 13 and 14.

The first arc-shaped magnet 15 is magnetized with an S pole on the outside in the radial direction and an N pole on the inside in the radial direction. On the other hand, the second arc-shaped magnet 16 is magnetized with an N pole on the outside in the radial direction and an S pole on the inside in the radial direction. Therefore, as indicated by a broken line arrow M in FIG. 8, in a region on the radially inner side of the magnetic circuit section 10, a magnetic field is formed by magnetic flux in a direction crossing the axis center CL from the first arc-shaped magnet 15 toward the second arc-shaped magnet 16.

When the magnetic circuit section 10 rotates or oscillates around the axis center CL together with the rotating body 3, a direction of the magnetic field formed in the region on the radially inner side of the magnetic circuit section 10 changes. The magnetic detection section 20 provided in the region on the radially inner side of the magnetic circuit section 10 (specifically, the inner region of the recess 51 of the resin section 50) outputs a signal according to the direction of the magnetic field formed by the magnetic circuit section 10. Also in the fourth embodiment, the magnetic circuit section 10 is formed in a cylindrical shape and surrounds the magnetic detection section 20, so that the magnetic circuit section 10 functions as a magnetic shield that prevents a disturbance magnetic field from entering the region on the radially inner side of the magnetic circuit section 10 from the region on the radially outer side of the magnetic circuit section 10.

In the fourth embodiment described above, the magnetic circuit section 10 included in the position detection device 1 is configured into a cylindrical shape by the first arc-shaped magnet 15 and the second arc-shaped magnet 16 so that the number of parts can be reduced.

Fifth Embodiment

A fifth embodiment will be described with reference to FIGS. 9 to 11. The fifth embodiment is an example in which the position detection device 1 described in the first embodiment and the like is applied to a brake pedal device 60.

The brake pedal device 60 described in the fifth embodiment is an organ-type pedal device that is mounted on a vehicle and operated by the driver's pedal effort. The organ-type pedal device is a configuration in which the part of the brake pedal 61 that is stepped on by the driver is arranged above the pivot axis center CL in the vertical direction when mounted on the vehicle.

First, a brake-by-wire system 100 in which the brake pedal device 60 of the fifth embodiment is used will be described with reference to FIG. 9. In FIG. 9, the signal lines are shown by broken lines.

Figure 9:
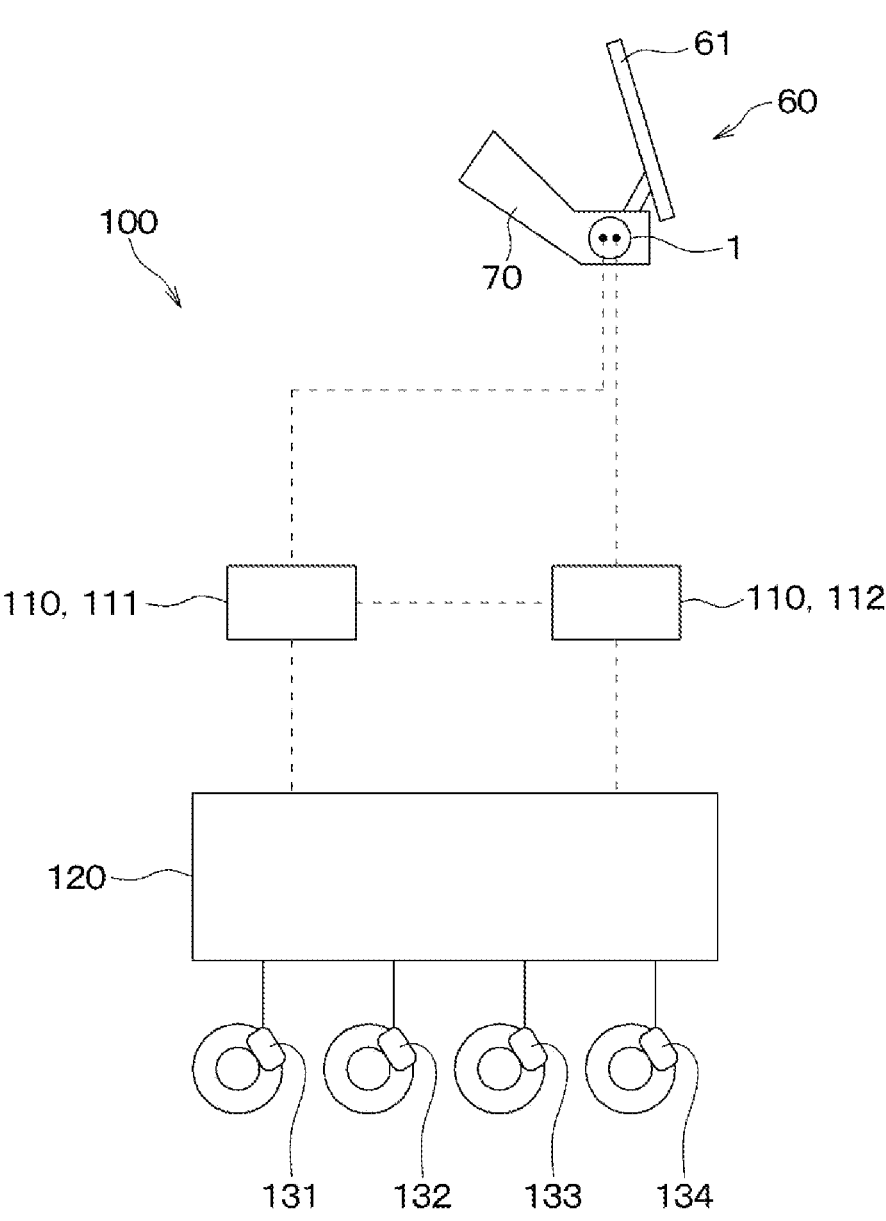
FIG. 9 is a schematic configuration diagram of a brake-by-wire system in which a brake pedal device according to a fifth embodiment is used.

As shown in FIG. 9, the brake-by-wire system 100 is a system in which a brake circuit 120 generates hydraulic pressure necessary for braking the vehicle under drive control of an electronic control unit 110 mounted on the vehicle, thereby driving wheel cylinders 131 to 134 based on the electric signal output from the position detection device 1 provided in the brake pedal device 60. Hereinafter, the electronic control unit 110 will be referred to as "ECU110". ECU110 is an abbreviation for Electronic Control Unit.

In the brake-by-wire system 100 illustrated in FIG. 9, the ECU 110 includes a first ECU 111 and a second ECU 112. The electric signal output from the position detection device 1 of the brake pedal device 60 is transmitted to the first ECU 111 and the second ECU 112.

Although FIG. 9 shows an example in which the position detection device 1 and the first ECU 111 are connected by one signal line, and the position detection device 1 and the second ECU 112 are connected by one signal line, it is not limited to this configuration. In the case of a configuration in which the magnetic rotation angle sensor and the inductive sensor included in the position detection device 1 output multiple outputs, the position detection device 1 and the first ECU 111 may be connected through a plurality of signal lines, and the position detection device 1 and the second ECU 112 may also be connected through a plurality of signal lines.

The first ECU 111 and the second ECU 112 include a microcomputer, a drive circuit, etc. (not shown). Both the first ECU 111 and the second ECU 112 can drive and control the brake circuit 120.

As the brake circuit 120, for example, a configuration may be adopted in which the hydraulic pressure of the brake fluid is increased by the operation of a master piston that reciprocates within a master cylinder (not shown) to drive the wheel cylinders 131 to 134 arranged at each wheel. The wheel cylinders 131 to 134 arranged on the respective wheels drive the brake pads provided on the respective wheels. The brake pads come into frictional contact with the corresponding brake discs, and each wheel is braked to slow the vehicle.

Further, the brake circuit 120 is also capable of performing normal control, ABS control, VSC control, etc. in response to control signals from the ECU 110. ABS stands for Anti-lock Braking System, and VSC stands for Vehicle Stability Control.

The brake circuit 120 is not limited to a configuration in which the master cylinder as described above generates hydraulic pressure in the brake fluid flowing through the brake circuit 120. For example, the brake circuit 120 may be configured to generate hydraulic pressure in the brake fluid flowing through the brake circuit 120 by driving a hydraulic pump, or may employ an electric brake.

Next, the brake pedal device 60 will be explained with reference to FIGS. 10 and 11. The coordinates described in FIGS. 10 and 11 indicate a vertical direction, a front-rear direction, and a left-right direction when the brake pedal device 60 is mounted on the vehicle.

Figure 10:
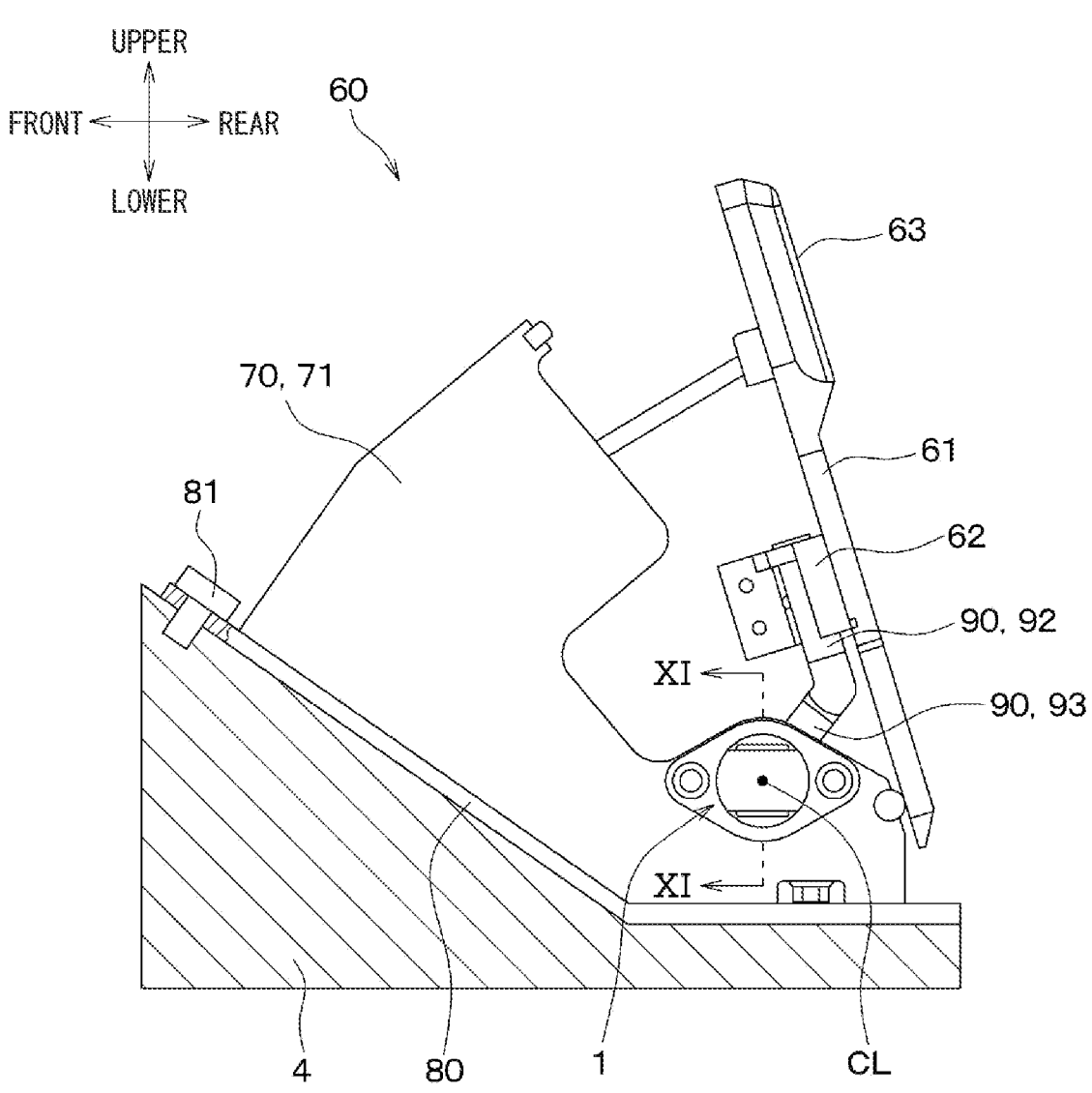
FIG. 10 is a side view of a brake pedal device according to a fifth embodiment.
Figure 11:
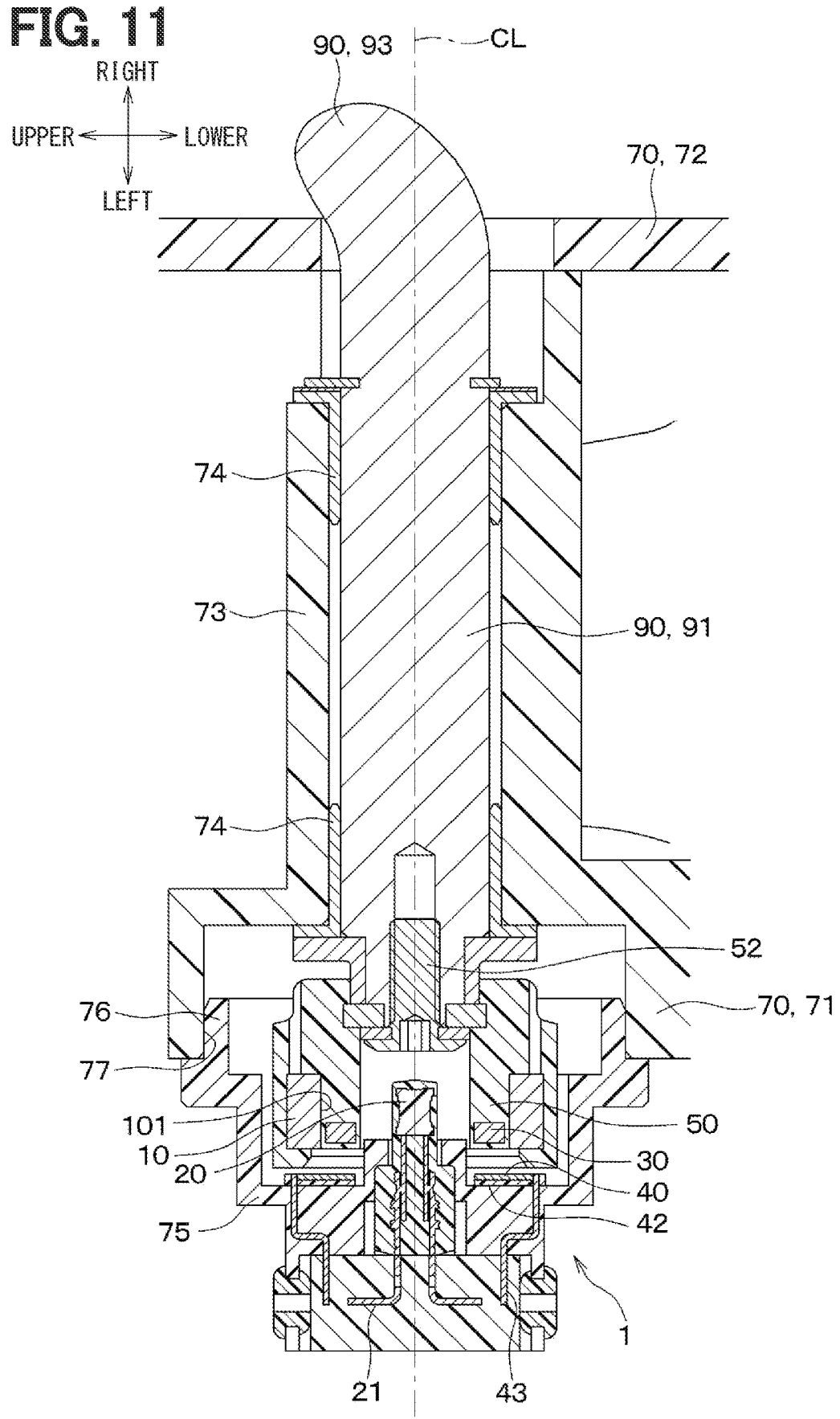
FIG. 11 is a cross-sectional view taken along a line XI-XI in FIG. 10.

As shown in FIGS. 10 and 11, the brake pedal device 60 includes a housing 70, a base plate 80, a shaft 90, a brake pedal 61, the position detection device 1, and the like. The housing 70 and the base plate 80 correspond to an example of "fixed body 2 that is directly or indirectly fixed to the vehicle."

The housing 70 is a member that holds or covers the shaft 90, the position detection device 1, and a reaction force generation mechanism (not shown). The housing 70 has a housing body 71 and a housing cover 72. Inside the housing body 71, a space is provided for arranging the position detection device 1, the reaction force generation mechanism, and the like. Further, the housing body 71 is provided with a shaft receiving portion 73 for rotatably supporting the shaft 90. The housing cover 72 is provided on the side surface of the housing body 71 and closes a side opening of a space formed inside the housing body 71.

The base plate 80 continuously extends from a portion of the housing 70 on the front side of the vehicle to a portion on the rear side of the vehicle. The base plate 80 is made of a material having higher strength than the housing 70, such as metal. The base plate 80 is fixed to a floor 4 or dash panel of the vehicle with bolts 81 or the like. The housing 70 is fixed to the base plate 80. That is, the housing 70 is fixed to the vehicle body via the base plate 80. The base plate 80 has a function of increasing the rigidity of the housing 70.

As shown in FIG. 11, the shaft 90 is rotatably or oscillatably supported by a shaft receiving portion 73 provided in the housing body 71. Specifically, a cylindrical bearing 74 for supporting the shaft 90 is attached to a shaft receiving portion 73 provided in the housing body 71, and the shaft 90 is supported by the bearing 74. Therefore, the shaft 90 can oscillate about the center of the shaft receiving portion 73 (that is, the center of the bearing 74) as the axis center CL.

As shown in FIGS. 10 and 11, the shaft 90 has a shape in which, for example, a cylindrical metal is bent multiple times, and includes a shaft portion 91, a fixing portion 92, and a connecting portion 93. The shaft portion 91 is a portion that extends parallel to the center line of the shaft receiving portion 73 (that is, the axis center CL of the shaft 90) and is disposed on the shaft receiving portion 73. The fixing portion 92 is a portion fixed to the brake pedal 61. The fixing portion 92 is fixed to a fixing metal fitting 62 provided on a surface of the brake pedal 61 that is opposite to the surface that receives pedal force from the driver (hereinafter referred to as "rear surface of the brake pedal 61"). The connecting portion 93 is a portion that connects the shaft portion 91 and the fixing portion 92. Since the shaft 90 has the shaft portion 91, the fixing portion 92, and the connecting portion 93, the shaft center CL of the shaft 90 and the brake pedal 61 are arranged at a position separated from each other, and a position detection device 1 can be easily provided in the area around the axis center CL.

The brake pedal 61 is formed into a plate shape of, for example, metal or resin, and is arranged diagonally with respect to the floor 4. Specifically, the brake pedal 61 is obliquely arranged so that the upper end thereof faces the front of the vehicle and the lower end thereof faces the rear of the vehicle. A thick portion 63 is provided on the upper portion of the brake pedal 61 as a portion to be stepped on by the driver. The thick portion 63 is arranged above the axis CL in the vertical direction when mounted on the vehicle.

As described above, the rear surface of the brake pedal 61 and the fixing portion 92 of the shaft 90 are fixed by the fixing metal fitting 62. Therefore, the brake pedal 61 oscillates around the same axis center CL as the shaft 90. That is, the axial center CL of the brake pedal 61 and the axial center CL of the shaft 90 are the same. The brake pedal 61 oscillates about the axis center CL in the forward and reverse directions within a predetermined angular range in response to an increase or decrease in the pedaling force of the driver.

Although not shown, a reaction force generating mechanism is provided within the housing 70 to generate a reaction force against the pedal force applied to the brake pedal 61 by the driver. The reaction force generating mechanism can be composed of one or more elastic members, actuators, or the like. By including the reaction force generation mechanism, the brake pedal device 60 can eliminate the mechanical connection between the master cylinder of the brake circuit 120 and the brake pedal 61. Even with such a configuration, the brake pedal device 60 is equipped with the reaction force generation mechanism. It is possible to obtain the same reaction force as when the master cylinder and the brake pedal 61 are connected (when the brake pedal 61 receives a reaction force due to hydraulic pressure from the master cylinder).

The brake pedal device 60 of the present embodiment has a configuration in which the brake pedal 61 and the shaft 90 oscillate around the same axis center CL. Therefore, the operation amount of the brake pedal 61 (that is, the oscillating angle of the brake pedal 61), which is depressed by the driver to control the running of the vehicle, is the same as the oscillating angle of the shaft 90. The oscillating angles of the brake pedal 61 and the shaft 90 are directly detected by the position detection device 1 provided on and around the axis center CL of the shaft 90.

As shown in FIG. 11, the position detection device 1 includes the magnetic circuit section 10, the magnetic detection section 20, the target 30, the coil 40, the transmitting and receiving circuit 41, and the like. The magnetic circuit section 10 and the magnetic detection section 20 constitute a magnet-type rotation angle sensor, and the target 30, the coil 40, and the transmitting and receiving circuit 41 constitute an inductive sensor. As the position detection device 1, it is possible to adopt the configurations described in the first to fourth embodiments.

The magnetic circuit section 10 and the target 30 are integrally formed by a resin section 50 and are formed into a sub-assembly. The resin portion 50 is fixed to one end of the shaft 90 as the rotating body 3 with a bolt 52 or the like. In this state, the center of the magnetic circuit section 10, the center of the target 30, and the axis center CL of the shaft 90 are aligned. The magnetic circuit section 10 and the target 30 oscillate together with the shaft 90 around the axis center CL of the shaft 90.

On the other hand, a circuit board 42 on which the coil 40 and the transmitting and receiving circuit 41 are mounted, and the magnetic detection section 20 are fixed to a sensor holding portion 75 as the fixed body 2. The sensor holding portion 75 is fixed to the housing body 71. That is, like the housing 70 and the base plate 80, the sensor holding portion 75 also corresponds to an example of "the fixed body 2 that is directly or indirectly fixed to the vehicle." Positioning of the sensor holding portion 75 and the housing 70 is performed by fitting a protrusion 76 provided on an outer peripheral edge of the sensor holding portion 75 into an inner wall surface 77 of an opening provided in the housing 70. In this state, misalignment between the magnetic detection section 20 provided on the sensor holding portion 75, the coil 40 provided on the circuit board 42, and the axis center CL of the shaft 90 can be prevented.

FIG. 10 shows a state in which the driver's pedal force is not applied to the brake pedal 61. Although not shown in the drawings, when the driver's pedal force is applied to the brake pedal 61, the brake pedal 61 and the shaft 90 oscillates around the axis center CL, and a portion of the brake pedal 61 above the vehicle with respect to the axis center CL moves toward the floor 4 or the dash panel. At this time, the position detection device 1 detects the oscillating angles of the brake pedal 61 and the shaft 90. Then, the position detection device 1 outputs an electric signal according to the oscillating angle to the ECU 110 mounted on the vehicle. The ECU 110 generates hydraulic pressure necessary for braking the vehicle to drive and control the brake circuit 120 so as to slow or stop the vehicle by driving the brake pads by the hydraulic pressure.

The brake pedal device 60 of the fifth embodiment described above includes the position detection device 1 described in the first to fourth embodiments. As a result, the brake pedal device 60 of the fifth embodiment prevents a disturbance magnetic field from entering the magnetic detection section 20, and has redundancy in detecting the oscillating angle of the shaft 90 using the magnet-type rotation angle sensor and the inductive sensor.

Further, this brake pedal device 60 is used in a complete brake-by-wire system 100 in which a component (for example, a master cylinder) of a brake circuit 120 that performs braking of a vehicle and a brake pedal 61 are not mechanically connected. The brake pedal device 60 described above has high reliability of the output signal of the position detection device 1 and has redundancy in detecting the oscillating angle of the shaft 90, so it is preferred for application to a brake pedal device 60 used in a complete brake-by-wire system 100.

OTHER EMBODIMENTS (1) In each of the above embodiments, the coil 40 and the target 30 constituting the inductive sensor are provided in a 360° range (that is, the entire circumference) around the axis CL, but the present disclosure is not limited to this configuration. For example, the coil 40 and the target 30 constituting the inductive sensor may be provided in a predetermined angular range (that is, a fan-shaped or arc-shaped range) smaller than 360° around the axis center CL.

(2) In the fifth embodiments, the brake pedal device 60 is described as an organ-type brake pedal device, but the brake pedal device 60 is not limited to this configuration and may be a pendant-type brake pedal device. The pendant-type pedal device is a configuration in which the part of the brake pedal 61 that is stepped on by the driver is arranged below the pivot axis CL in the vertical direction when mounted on the vehicle.

(3) In the fifth embodiment, the brake pedal device 60 has been described as being used in a complete brake-by-wire system 100, but the brake pedal device 60 is not limited to this configuration, and may be used in a normal brake-by-wire system 100. The normal brake-by-wire system 100 is a configuration in which the ECU 110 drives and controls the brake circuit 120 based on the output signal of the position detection device 1, and the master cylinder of the brake circuit 120 and the brake pedal 61 are mechanically connected.

(4) In the fifth embodiment, the ECU 110 included in the brake-by-wire system 100 is composed of the first ECU 111 and the second ECU 112, but the present disclosure is not limited to this configuration. For example, the ECU 110 may be composed of one piece, or may be composed of three or more pieces.

The present disclosure is not limited to the above-described embodiments, and can be appropriately modified. The above-described embodiments are not independent of each other, and can be appropriately combined together except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Further, in each of the above-mentioned embodiments, when referring to the shape, positional relationship, and the like of a component and the like, the component is not limited to the shape, positional relationship, and the like, except for the case where the component is specifically specified, the case where the component is fundamentally limited to a specific shape, positional relationship, and the like.

The control apparatus and the technique according to the present disclosure may be achieved by a dedicated computer provided by constituting a processor and a memory programmed to execute one or more functions embodied by a computer program. Alternatively, the controller and the technique according to the present disclosure may be achieved by a dedicated computer provided by constituting a processor with one or more dedicated hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

What is claimed is:

1. A position detection device for detecting a position of a rotating body that is rotatably or oscillatably provided around a predetermined axis center with respect to a fixed body, the position detection device comprising:

a target formed of a conductor and fixed to the rotating body;

an inductive coil fixed to the fixed body at a position facing the target in an axis center direction;

a transmitting and receiving circuit configured to detect a position of the target based on a change in inductance of the inductive coil that changes due to an eddy current flowing through the target when an alternating current is applied to the inductive coil;

a magnetic circuit section formed in a cylindrical shape around the axis center, fixed to the rotating body, and forming a magnetic field in which magnetic flux flies in a direction intersecting the axis center;

a magnetic detection section fixed to the fixed body and provided in a region on a radially inner side than an inner circumferential surface of the magnetic circuit section, and configured to output a signal according to a magnetic field formed by the magnetic circuit section; and a circuit board on which the inductive coil and the transmitting and receiving circuit are mounted, wherein an inductive sensor is configured by the target, the inductive coil, and the transmitting and receiving circuit, a magnet type rotation angle sensor is configured by the magnetic circuit section and the magnetic detection section, the magnetic detection section is formed integrally with the fixed body by resin insert molding, and is provided so as to extend from the base of the fixed body to a region on a radially inner side of the magnetic circuit section, and the circuit board is provided on a surface of the fixed body facing the magnetic circuit section, and has a hole through which the magnetic detection section is inserted.

2. The position detection device according to claim 1, wherein a thickness of the inductive coil in the axis center direction of the circuit board is smaller than a thickness of the target in the axis center direction.

3. The position detection device according to claim 1, further comprising a processing circuit configured to compare a difference between a position of the rotating body derived from the output signal of the transmitting and receiving circuit and a position of the rotating body derived from the output signal of the magnetic detection section with a predetermined threshold value, and self-diagnose whether an output signal of the transmitting and receiving circuit and an output signal of the magnetic detection section are normal.

4. The position detection device according to claim 1, wherein the magnetic circuit section is configured by connecting both ends of a first arc-shaped magnet having an arc-shaped cross section perpendicular to the axis center and both ends of a second arc-shaped magnet having an arc-shaped cross section perpendicular to the axis center, the first arc-shaped magnet is magnetized with an S pole on an outside in a radial direction and an N pole on an inside in the radial direction, and the second arc-shaped magnet is magnetized with an N pole on the outside in the radial direction and an S pole on the inside in the radial direction.

5. A brake pedal device for a brake-by-wire type mounted on a vehicle, comprising:

a position detection device according to claim 1;

the fixed body directly or indirectly fixed to the vehicle;

a shaft as the rotating body;

a brake pedal fixed to the shaft and oscillating around the axis center of the shaft.

6. The brake pedal device according to claim 5, wherein a component of a brake circuit that performs braking of the vehicle and the brake pedal are not mechanically connected, and the brake pedal device is used in a complete brake-by-wire system in which an electronic control device mounted on the vehicle controls driving of the brake circuit based on an output signal of the position detection device to brake the vehicle.

7. A position detection device for detecting a position of a rotating body that is rotatably or oscillatably provided around a predetermined axis center with respect to a fixed body, the position detection device comprising:

a target formed of a conductor and fixed to the rotating body;

an inductive coil fixed to the fixed body at a position facing the target in an axis center direction;

a transmitting and receiving circuit configured to detect a position of the target based on a change in inductance of the inductive coil that changes due to an eddy current flowing through the target when an alternating current is applied to the inductive coil;

a magnetic circuit section formed in a cylindrical shape around the axis center, fixed to the rotating body, and forming a magnetic field in which magnetic flux flies in a direction intersecting the axis center;

a magnetic detection section fixed to the fixed body and provided in a region on a radially inner side than an inner circumferential surface of the magnetic circuit section, and configured to output a signal according to a magnetic field formed by the magnetic circuit section; and a circuit board on which the magnetic detection section, the inductive coil and the transmitting and receiving circuit are mounted, wherein an inductive sensor is configured by the target, the inductive coil, and the transmitting and receiving circuit, a magnet type rotation angle sensor is configured by the magnetic circuit section and the magnetic detection section, the circuit board is provided on a surface of the fixed body facing the magnetic circuit section, and the magnetic detection section is provided so as to extend from the circuit board to a region on the radially inner side of the magnetic circuit section.

8. A position detection device for detecting a position of a rotating body that is rotatably or oscillatably provided around a predetermined axis center with respect to a fixed body, the position detection device comprising:

a target formed of a conductor and fixed to the rotating body;

an inductive coil fixed to the fixed body at a position facing the target in an axis center direction;

a transmitting and receiving circuit configured to detect a position of the target based on a change in inductance of the inductive coil that changes due to an eddy current flowing through the target when an alternating current is applied to the inductive coil;

a magnetic circuit section formed in a cylindrical shape around the axis center, fixed to the rotating body, and forming a magnetic field in which magnetic flux flies in a direction intersecting the axis center;

a magnetic detection section fixed to the fixed body and provided in a region on a radially inner side than an inner circumferential surface of the magnetic circuit section, and configured to output a signal according to a magnetic field formed by the magnetic circuit section; and a resin section configured integrally with the magnetic circuit section and the target inserted in resin, wherein an inductive sensor is configured by the target, the inductive coil, and the transmitting and receiving circuit, and a magnet type rotation angle sensor is configured by the magnetic circuit section and the magnetic detection section.

9. A position detection device for detecting a position of a rotating body that is rotatably or oscillatably provided around a predetermined axis center with respect to a fixed body, the position detection device comprising:

a target formed of a conductor and fixed to the rotating body;

an inductive coil fixed to the fixed body at a position facing the target in an axis center direction;

a transmitting and receiving circuit configured to detect a position of the target based on a change in inductance of the inductive coil that changes due to an eddy current flowing through the target when an alternating current is applied to the inductive coil;

a magnetic circuit section formed in a cylindrical shape around the axis center, fixed to the rotating body, and forming a magnetic field in which magnetic flux flies in a direction intersecting the axis center; and a magnetic detection section fixed to the fixed body and provided in a region on a radially inner side than an inner circumferential surface of the magnetic circuit section, and configured to output a signal according to a magnetic field formed by the magnetic circuit section, wherein an inductive sensor is configured by the target, the inductive coil, and the transmitting and receiving circuit, a magnet type rotation angle sensor is configured by the magnetic circuit section and the magnetic detection section, and the target is arranged in a region on a radially inner side than an inner circumferential surface of the magnetic circuit section.

10. The position detection device according to claim 9, wherein at least a part of the target and a part of the magnetic circuit section overlap in a radial direction when viewed from the radial direction of the magnetic circuit section.

* * * * *